US010355616B2

(12) United States Patent
Andrieux et al.

(10) Patent No.: US 10,355,616 B2
(45) Date of Patent: Jul. 16, 2019

(54) ELECTROMECHANICAL ASSEMBLY COMPRISING AN ALTERNATOR

(71) Applicant: MOTEURS LEROY-SOMER, Angouleme (FR)

(72) Inventors: Christian Andrieux, Angouleme (FR); Daniel Ehanno, Angouleme (FR)

(73) Assignee: MOTEURS LEROY-SOMER, Angouleme (FR)

( * ) Notice: Subject to any disclaimer, the term of this patent is extended or adjusted under 35 U.S.C. 154(b) by 0 days.

(21) Appl. No.: 15/554,455

(22) PCT Filed: Mar. 2, 2016

(86) PCT No.: PCT/EP2016/054475
§ 371 (c)(1),
(2) Date: Aug. 30, 2017

(87) PCT Pub. No.: WO2016/139277
PCT Pub. Date: Sep. 9, 2016

(65) Prior Publication Data
US 2018/0048246 A1 Feb. 15, 2018

(30) Foreign Application Priority Data

Mar. 5, 2015 (FR) .................... 15 51839

(51) Int. Cl.
*H02M 7/08* (2006.01)
*H02M 7/23* (2006.01)
(Continued)

(52) U.S. Cl.
CPC .............. *H02M 7/23* (2013.01); *H02M 1/42* (2013.01); *H02M 7/08* (2013.01); *F02B 63/04* (2013.01);
(Continued)

(58) Field of Classification Search
CPC .... H02M 2001/007; H02M 7/40; H02M 7/08; H02M 7/23; H02M 2003/0552
See application file for complete search history.

(56) References Cited

U.S. PATENT DOCUMENTS 9,431,943 B2 8/2016 Moreau et al.
2002/0105819 A1 8/2002 Giraud et al.
(Continued)

FOREIGN PATENT DOCUMENTS

DE 44 28 907 A1 2/1995
DE 100 11 750 A1 9/2001
(Continued)

OTHER PUBLICATIONS

International Search Report and Written Opinion from Corresponding Application No. PCT/EP2016/054475; dated May 24, 2016.

*Primary Examiner* — Fred E Finch, III
*Assistant Examiner* — Ishrat F Jamali
(74) *Attorney, Agent, or Firm* — Pearne & Gordon LLP

(57) ABSTRACT

The invention relates to an electromechanical assembly comprising: an alternator with a wound rotor; a regulator acting on the excitation of the alternator; a rectifier at the outlet of the alternator, supplying a rectified voltage to a continuous bus; and a booster circuit connected by means of a filter to the outlet of the alternator and supplying a voltage to the continuous bus.

19 Claims, 3 Drawing Sheets

(51) Int. Cl.
*H02M 1/42* (2007.01)
*F02B 63/04* (2006.01)
(52) U.S. Cl.
CPC .... *H02M 2001/4283* (2013.01); *Y02B 70/126* (2013.01)

(56) References Cited

U.S. PATENT DOCUMENTS

| | | |
|---|---|---|
| 2003/0053324 A1 | 3/2003 | Yamamoto et al. |
| 2003/0141854 A1 | 7/2003 | Kuribayashi et al. |
| 2008/0074074 A1* | 3/2008 | Skibinski .............. H02M 7/003 318/800 |
| 2013/0313828 A1 | 11/2013 | Moreau et al. |
| 2014/0145653 A1* | 5/2014 | Nee ........................ H02P 6/188 318/400.02 |

FOREIGN PATENT DOCUMENTS

| | | |
|---|---|---|
| FR | 2 971 648 A1 | 8/2012 |
| NO | 2012/110979 A1 | 8/2012 |

* cited by examiner

ELECTROMECHANICAL ASSEMBLY COMPRISING AN ALTERNATOR

FIELD OF THE INVENTION

The present invention relates to the conversion of mechanical energy, obtained for example by virtue of a combustion engine, into electrical energy.

The invention relates to an electromechanical assembly including an alternator, in particular of high power, typically greater than or equal to 200 kW.

BACKGROUND OF THE INVENTION

An alternator includes, in a manner known per se, a field winding, generally at the rotor, supplied with DC current either by rings and brushes or by an exciter, so as to generate an AC voltage in an armature winding, generally at the stator.

There are several known solutions for delivering a DC voltage from an alternator operating at variable speed.

A first solution, illustrated in FIG. 1, consists in rectifying the AC voltage delivered by the alternator 10 by means of a simple diode bridge 11. The excitation of the rotor of the alternator by means of an exciter 12 or by an assembly composed of rings and brushes is continuously adjusted by a regulator 13 in order to maintain a constant DC voltage regardless of the speed of the driving element and the power to be delivered.

This simple and robust solution is only able to be used when the range of variation of speed and of power is relatively low. For example, for a generator set in which the power of the combustion engine decreases in terms of $N^3$, the range of variation of rotational speed is typically from 75% to 120% of the nominal rotational speed. Expanding this speed range downward involves significant oversizing of the alternator, thereby increasing the cost thereof.

A second solution, illustrated in FIG. 2, consists in rectifying the AC voltage delivered by the alternator 10 by means of an active rectifier 15 composed of an IGBT inverter, controlled by pulse width modulation. For certain operating points, in particular those for which the excitation current of the revolving that is required for obtaining the desired DC voltage does not lead to saturation of the magnetic circuit, the transistors 16 of the inverter are not controlled, and the rectification is carried out in a manner identical to that described for solution 1. For the other operating points, the excitation current of the revolving field is kept fixed and the transistors of the inverter are driven in order to step up the voltage to the desired level. The publication WO 2012/110979 A1 describes, in particular, a means for arbitrating between the two types of operation in order to minimize the level of overall losses from the system.

This solution enables operation over a wide speed range, for example from 40% to 120% of the nominal speed, but nevertheless has the following drawbacks:

BRIEF SUMMARY OF THE INVENTION it is expensive, as the inverter has to be dimensioned for the maximum power supplied by the alternator;
the switching operations of the inverter generate high common-mode currents that are able to flow in the bearings of the alternator and affect their service life, and to create electromagnetic radiation that risks interfering with the other electrical devices in the installation; and
the switching operations of the inverter may cause partial discharges, which reduce the service life of the winding of the alternator.

A third solution, illustrated in FIG. 3, consists in rectifying the AC voltage delivered by the alternator 10 by means of a diode bridge 11 in association with a step-up chopper 17, as described in the application US2002/105819. For some of the operating points, in particular those for which the excitation current of the rotor that is required for obtaining the desired DC voltage does not lead to saturation of the magnetic circuit of the alternator, the step-up chopper is not controlled, and the rectification is carried out in a manner identical to that described for the first solution. For the other operating points, the excitation current of the revolving field is kept fixed and the step-up chopper is activated in order to step up the voltage to the desired level.

This third solution enables operation over a wide speed range, for example from 40% to 120% of the nominal speed. It nevertheless has the following drawbacks:

the diodes of the rectifier bridge have to be fast recovery diodes, as they are subjected to the high dV/dt of the step-up chopper; these fast recovery diodes are much more expensive than the standard recovery diodes of the first solution;
the switching operations of the step-up chopper generate high common-mode currents that are able to flow in the bearings of the alternator and affect their service life, and to create electromagnetic radiation that risks interfering with the other electrical devices in the installation, as in the second solution; and
the switching operations of the step-up chopper may cause partial discharges, which reduce the service life of the winding of the alternator.

There is consequently a need to mitigate the above drawbacks, and the invention achieves this by virtue of an electromechanical assembly, including:
a wound-rotor alternator,
a regulator acting on the excitation of the alternator,
a rectifier at the output of the alternator, delivering a rectified voltage to a DC bus,
a step-up circuit linked by means of a filter to the output of the alternator, and delivering a voltage to the DC bus.

In comparison with the known solutions, the invention makes it possible:
to operate over a wide range of variable states, in particular at variable speed and power, by means of a step-up circuit that is dimensioned for a fraction of the maximum power to be transmitted, and of a rectifier that is dimensioned for the maximum power. This solution is much less expensive than the second and third solutions above;
to use a rectifier bridge in which the components are standard recovery time components, in contrast to the third solution above;
to eliminate the risk of common-mode currents in the bearings of the alternator; and
to eliminate the risk of partial discharge in the winding of the alternator.

The rectifier is preferably a diode rectifier. The latter may be standard recovery time diodes, in particular with a $t_{rr}$ (reverse recovery time) of greater than or equal to 4 µs.

The filter may include an inductor in series on each of the output phases. The inductance of the inductor is, for example, between 40 µH and 80 µH, in particular for a 500 kW converter connected to a 650 V DC bus, or between 120 µH and 240 µH, in particular for a 500 kW converter connected to a 1000 V DC bus.

The inductance of the inductors is preferably chosen such that, at the nominal current, the voltage drop across the inductor is between 4% and 12% of the nominal voltage of the alternator.

The filter may include two capacitors linking each phase to the DC bus. These two capacitors may be equal. The capacitance of each capacitor may be between 80 µF and 300 µF, in particular for a 500 kW converter connected to a 650 V DC bus, or between 25 µF and 100 µF, in particular for a 500 kW converter connected to a 1000 V DC bus.

The capacitance of each capacitor is preferably chosen such that the cut-off frequency of the LC filter is between 1000 Hz and 5000 Hz.

The capacitors are preferably linked to the upstream terminal of the inductors, that is to say to the one that is linked to the alternator.

The LC filter may be damped, for example by inserting a resistor in series with the capacitors.

The step-up circuit may be dimensioned for a fraction of the maximum power to be transmitted, in particular less than ½ of the nominal power, whereas the rectifier is dimensioned for the maximum power to be transmitted.

The rotor may be supplied with power by an AC-to-DC converter.

The regulator may act on the excitation current. If of an exciter of the alternator.

In a first mode of operation of the assembly according to the invention, the excitation current is regulated in such a way as to servo-control the voltage of the DC bus to a setpoint value.

In a second mode of operation, the voltage of the alternator is rectified and stepped up by the step-up circuit to a setpoint voltage Udc_ref. The excitation current of the alternator may be regulated such that the level of magnetic saturation of the alternator does not exceed a predefined value, for example in order to have a coefficient of saturation of between 1.25 and 1.6.

The step-up circuit preferably includes an inverter. In this case, in the second mode of operation, the inverter may be controlled by a pulse width modulation (PWM) technique at a set modulation frequency.

The invention also pertains to a method for producing electricity, in which the alternator of an electromechanical assembly according to the invention, as defined above, is driven in rotation.

The first mode of operation may be selected when the speed of the alternator is preferably between 80% and 120% of its nominal speed, and the second mode of operation may be selected when the speed of the alternator is lower than that of the first mode, preferably less than 80% of its nominal speed.

The second mode of operation may be selected when the power to be transmitted is lower than in the first mode.

The invention will be able to be better understood upon reading the following detailed description of a non-limiting exemplary implementation thereof, and upon examining the appended drawing, in which:

DESCRIPTION OF EXAMPLE EMBODIMENTS

Figure 1:
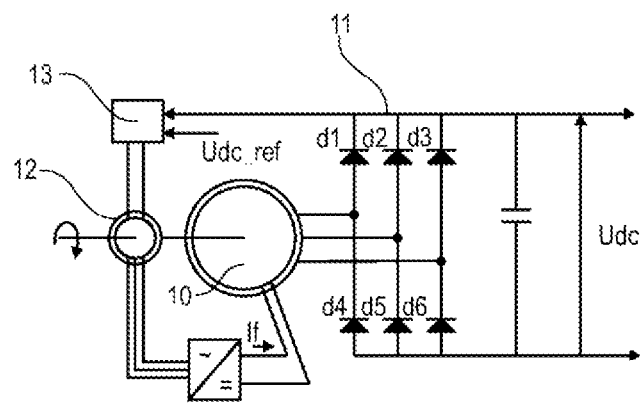
FIGS. 1 to 3, described previously, illustrate the prior art.
Figure 2:
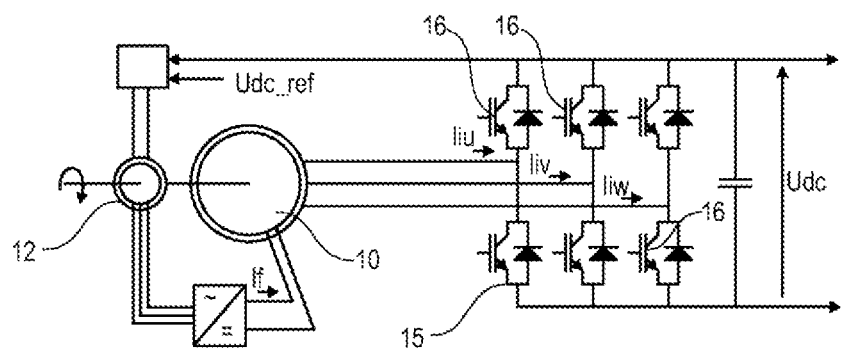
Figure 3:
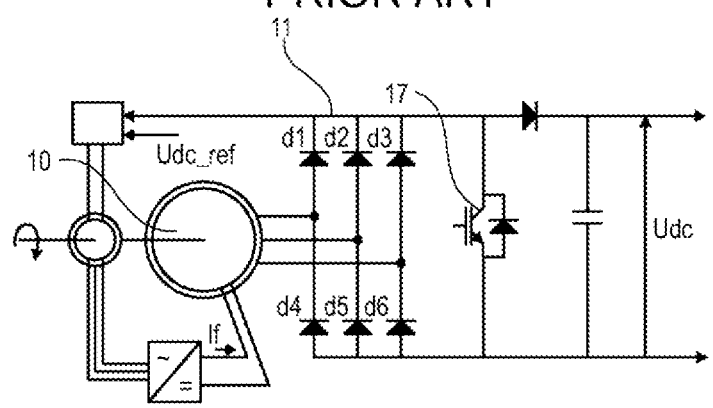
Figure 4:
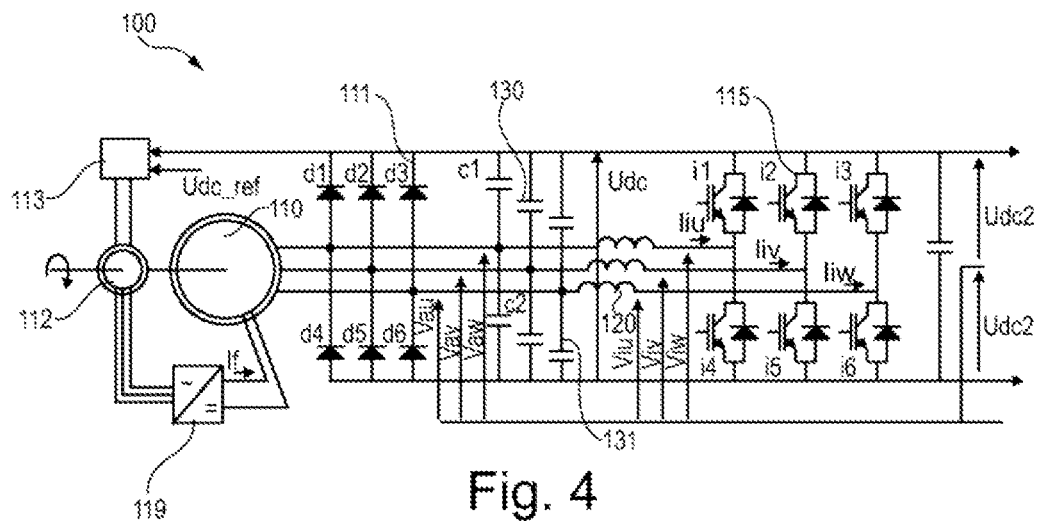
FIG. 4 is a schematic drawing of an example of an assembly according to the invention.

The assembly 100 according to the invention includes, as illustrated in FIG. 1, a wound-rotor synchronous alternator 110, the rotor of which is supplied with DC current by an exciter 112 associated with a rotary AC-to-DC converter 119. A voltage regulator 113 connected to the field winding of the exciter makes it possible to regulate the voltage of the DC bus.

A rectifier 111 formed of diodes d1 to d6, in particular of standard recovery time ($t_{rr}$) diodes, rectifies the voltage of the alternator 110. This rectifier 111 is dimensioned for the maximum power to be delivered.

A step-up circuit 115 is connected to the alternator and to the DC bus. This step-up circuit 115 is composed of a voltage inverter, for example an inverter with switching elements i1 to i6 that are formed by IGBTs. The inverter 115 is controlled by pulse width modulation.

An RLC filter links the alternator 110 to the inverter 115. This filter includes inductors 120 in series with the output phases of the alternator, and pairs of capacitors 130, 131 linked to the DC bus. The filter includes six capacitors c1 to c6, linked in pairs to each phase. The step-up circuit 115 is dimensioned for only a fraction of the maximum power to be delivered.

The alternator is driven by a combustion engine. As a variant, the driving element is a wind turbine, for example. In one variant that is not illustrated, the alternator still has a wound rotor, but the rotor is supplied with DC current by an assembly composed of rings and brushes.

In a first mode of operation, the AC voltage of the alternator is rectified by the diodes d1 to d6. The excitation current of the rotor. If is continuously adjusted by the regulator 113 in order to servo-control the DC voltage Udc to a setpoint value Udc_ref, which may be constant or variable.

The regulator is for example an off-the-shelf regulator, such as the one referenced D510 from Leroy Somer.

Only a residual current that is not factored into the design passes through the switching elements i1 to i6 of the inverter. This mode of operation is preferably used in a zone B of the power-speed plane, where the excitation current If of the rotor that is required in order to achieve the setpoint DC voltage does not lead to saturation of the magnetic circuit of the alternator. This zone of the power-speed plane is located, as is visible in FIG. 5, where the power to be supplied is the greatest.

Figure 5:
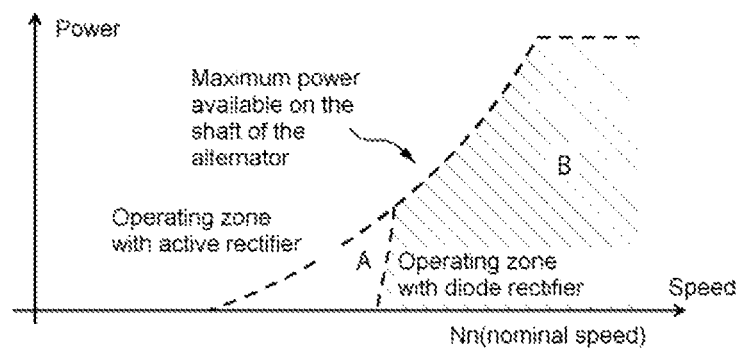
FIG. 5 shows an example of the variation of the power as a function of the rotational speed.

In a second mode of operation, preferably used at the lowest speeds, corresponding to the zone A in FIG. 5, the voltage of the alternator is rectified and stepped up, by the inverter, to the setpoint voltage Udc_ref.

In this mode of operation, the excitation current of the rotor is regulated such that the saturation level of the alternator does not exceed a certain defined value in order, inter alia, to minimize losses, for example in order to maintain a coefficient of saturation of less than 1.25.

The filter formed of the induction coils 120 and of the capacitors c1 to c6 significantly attenuates, at the points Vau, Vav, Vaw, the harmonics of the voltages Viu, Viv, Viw of the inverter in differential mode and in common mode.

The advantage of this filtering guarantees that the switching operations of the inverter do not have an impact on the reliability of the winding of the alternator. It also guarantees the absence of steep voltage edges between the 3 phases of the alternator and the ground of the system, which edges would be liable to destroy the bearings of the alternator by creating common-mode currents, and the non-conduction of the diodes d1 to d6, in particular at the instants of inverter switching operations, thereby enabling the use of standard recovery time diodes.

In the preferred use zone of this second mode of operation, the element driving the alternator may deliver only a portion of its maximum power, thereby making it possible to dimension the inverter, the induction coils and the capacitors only for a fraction of the nominal power, for example ⅓ of the nominal power for a generator set in which the power of the combustion engine decreases in terms of $N^3$.

For this second mode of operation, there are a plurality of known methods for regulating the voltage Udc to the setpoint value Udc_ref and for generating the commands for controlling the inverter.

Figure 6:
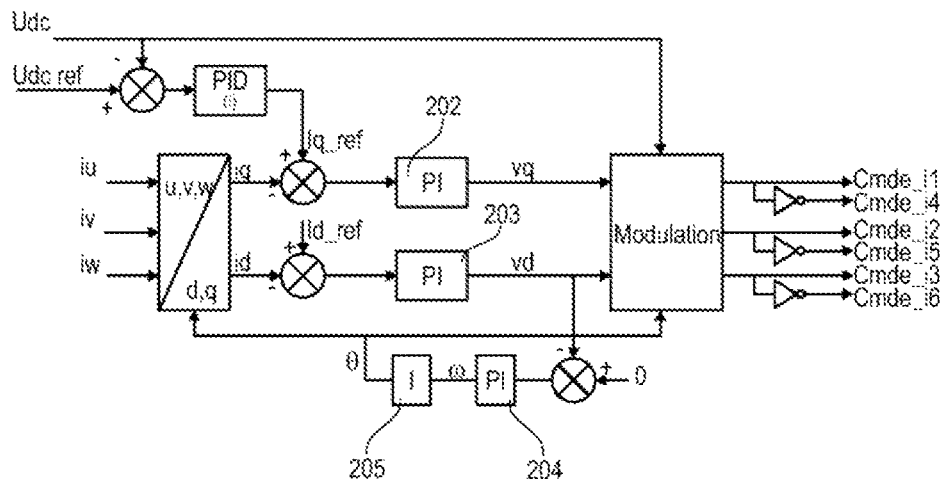
FIG. 6 illustrates an example of a regulation circuit.

One of these methods will be described with reference to FIG. 6.

The reference frame d,q that is used is an orthonormal reference frame, rotating at the frequency of the fundamental voltage of the alternator. The imaginary currents id, iq are obtained after having applied a three-phase/two-phase transformation, followed by a rotation of angle θ, to the 3 currents Iiu, Iiv, Iiw. The angle θ is chosen such that a modification of the value of the current iq acts only on the active power at the input of the inverter, and such that a modification of the value of the current id acts only on the reactive power.

The value of the voltage of the DC bus is regulated to the setpoint value Udc_ref by a PID (proportional-integral-derivative) controller 201, the output of which forms the current setpoint iq_ref.

The current setpoint id_ref is chosen, for example, so as to minimize the losses of the alternator, as described in the publication WO 2012/110979 A1.

Two PI (proportional-integral) controllers 202 and 203 make it possible to servo-control the currents id and iq to the respective setpoints id_ref and iq_ref. The output of these two current regulators, in the rotating reference frame, represents the 2 orthonormal components Vd, Vq of the voltage vector that has to be applied at the input of the inverter.

The condition regarding the angle θ cited above is met when the voltage Vd is equal to 0. The PI and I (integral) controllers 204 and 205 act as a PLL (phase locked loop). They servo-control the voltage Vd to 0, and make it possible to define the angle θ.

The 'Modulation' unit defines the instants of closure and of opening of the switching elements of each of the arms of the inverter, in accordance with a known pulse width modulation (PWM) method.

Figure 7:
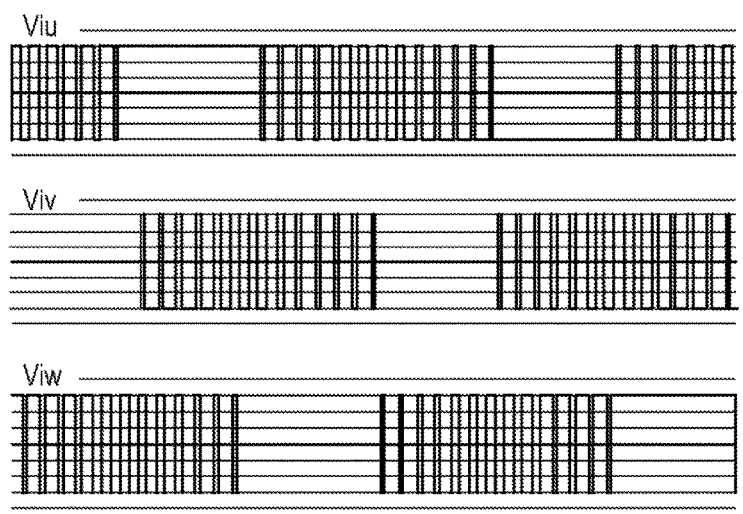
FIG. 7 is a timing diagram of the voltages of the inverter.

In the example under consideration, the chosen technique is a pulse width modulation PWM at a set modulation frequency, where only 2 of the 3 arms of the inverter switch for each chopping period, as illustrated in FIG. 7. The inverter arm that does not switch is, for example, the one for which the absolute value of the current is the highest of the 3 arms, in order to minimize the losses of the inverter. The duty cycles of the 2 phases that switch depend on the values Vd_ref, Vq_ref, on the angle θ and on the voltage Udc, as illustrated in FIG. 7.

The invention is not limited to the example that has just been described. In particular, it is possible to replace the diode bridge 111 with a thyristor bridge or with a mixed bridge.

It is also possible to use a plurality of diode bridges.

It is possible to replace the inverter with a step-up chopper.

The expression 'including a(n)' should be understood as a synonym for 'comprising at least one'.

The invention claimed is:

1. An electromechanical assembly, including:
   a wound-rotor alternator,
   a regulator acting on the excitation of the alternator,
   a rectifier at output phases of the alternator, delivering a rectified voltage to a DC bus,
   a step-up circuit linked by means of a filter to the output phases of the alternator, and delivering a voltage to the DC bus, the filter including
   an inductor in series at each output phase of the alternator, the inductor being connected directly to an output phase of the alternator and linking the output phase of the alternator to the step-up circuit, and
   two capacitors being connected directly to each output phase of the alternator and linking each output phase of the alternator to the DC bus.

2. The assembly as claimed in claim 1, the rectifier being a diode rectifier.

3. The assembly as claimed in claim 2, the diode being standard recovery time diode.

4. The assembly as claimed in claim 3, the diodes having a $t_{rr}$ greater than or equal to 4 μs.

5. The assembly as claimed in claim 1, the capacitors having a capacitance that is chosen such that the frequency of an LC filter, L being the inductance of an inductor between 1 kHz and 5 kHz.

6. The assembly as claimed in claim 1, the step-up circuit being dimensioned for a fraction of the maximum power to be transmitted.

7. The assembly as claimed in claim 6, the step-up circuit being dimensioned for less than ½ of the nominal power.

8. The assembly as claimed in claim 1, the rectifier being dimensioned for the maximum power to be transmitted.

9. The assembly as claimed in claim 1, the wound-rotor alternator being supplied with DC current by an exciter of the alternator, wherein the exciter is associated with an AC-to-DC converter.

10. The assembly as claimed in claim 9, the regulator acting on excitation current of the exciter.

11. The assembly as claimed in claim 9, the AC-to-DC converter being a rotary converter.

12. The assembly as claimed in claim 1, wherein, in a first mode of operation, the excitation current is regulated in such a way as to servo-control the voltage of the DC bus to a setpoint value.

13. The assembly as claimed claim 1, wherein, in a second mode of operation, the voltage of the alternator is rectified and stepped up by the step-up circuit to a setpoint voltage Udc_ref.

14. The assembly as claimed in claim 1, an excitation current of the alternator being regulated such that the level of magnetic saturation of the alternator does not exceed a coefficient of saturation of between 1.25 and 1.6.

15. The assembly as claimed in claim 1, the step-up circuit including an inverter.

16. The assembly as claimed in claim 15, the inverter being controlled by a pulse width modulation (PWM) technique.

17. A method for producing electricity using the electromechanical assembly as claimed in claim 1, wherein the alternator is driven in rotation.

18. The method as claimed in claim 17, wherein, in a first mode of operation, an excitation current is regulated in such a way as to servo-control the voltage of the DC bus to a setpoint value, the first mode of operation being selected when the speed of the alternator is between 80% and 120% of its nominal speed, and wherein, in a second mode of operation, the voltage of the alternator is rectified and stepped up by the step-up circuit to a setpoint voltage Udc_ref, the second mode of operation being selected when the speed of the alternator is lower than in the first mode.

19. The assembly as claimed in claim 1, the inductor having an inductance that is chosen such that the voltage drop across the inductor is between 4% and 12% of the nominal voltage of the alternator.

* * * * *